United States Patent [19]
Webster

[11] Patent Number: 5,847,532
[45] Date of Patent: Dec. 8, 1998

[54] SWITCHING CIRCUIT FOR AN INDUCTIVE LOAD

[75] Inventor: Paul Donald Webster, Leeds, United Kingdom

[73] Assignee: Switched Reluctance Drives Limited, Harrogate, England

[21] Appl. No.: 673,805

[22] Filed: Jun. 27, 1996

[30] Foreign Application Priority Data

Jul. 7, 1995 [GB] United Kingdom .................... 9513916

[51] Int. Cl.$^6$ ....................................................... H02P 8/00
[52] U.S. Cl. ............................................ 318/701; 318/254
[58] Field of Search .................................. 318/254, 439, 318/701; 310/179, 197, 269

[56] References Cited

U.S. PATENT DOCUMENTS

| | | |
|---|---|---|
| 5,422,525 | 6/1995 | Mansir . |
| 5,493,195 | 2/1996 | Heglund et al. . |
| 5,504,410 | 4/1996 | Davis ....................................... 318/701 |
| 5,563,487 | 10/1996 | Davis ....................................... 318/701 |
| 5,627,445 | 5/1997 | Webster ................................... 318/701 |

FOREIGN PATENT DOCUMENTS

| | | |
|---|---|---|
| 0 074 752 | 8/1982 | European Pat. Off. . |
| 0 320 560 A1 | 6/1989 | European Pat. Off. . |
| 40 36 565 C1 | 5/1992 | Germany . |

OTHER PUBLICATIONS

Patent Abstracts of Japan, vol. 005, No. 040 (E–049), 17 Mar. 1981 & JP 55 162886 A (Fuji Electric Co Ltd), 18 Dec. 1980.

*Primary Examiner*—John W. Cabeca
*Attorney, Agent, or Firm*—Patterson & Keough, PA

[57] ABSTRACT

A switching circuit for an inductive load such as a switched reluctance machine comprises two separate switching circuits for separate portions of the inductive load. A supply voltage is applied across the two circuits which are connected together at a node between two dc link capacitors. Each separate circuit is exposed to only approximately half the supply voltage between a respective terminal and the central node so that conventional switching components can be used to handle higher voltages applied across the two connected circuits.

13 Claims, 4 Drawing Sheets

SWITCHING CIRCUIT FOR AN INDUCTIVE LOAD

BACKGROUND OF THE INVENTION

1. Field of the Invention

This invention relates to switching circuits for inductive loads. The invention is particularly applicable to a switching circuit for a switched reluctance machine.

2. Description of Related Art

Reluctance machines are electrical machines which produce torque by the tendency of a moving component of the machine to take up a position in which the reluctance of the magnetic circuit is minimized. Typically, at least one of the stator and rotor members has magnetic saliencies which are normally realized in the form of poles projecting from the member.

The switched reluctance (SR) machine is a particular form of reluctance machine which has salient poles on both stator and rotor members. In this form they are referred to as 'doubly salient' machines. The developed torque or electrical output (depending on whether the machine is run as a motor or a generator) is controlled by a controller which regulates the period during which a stator winding is electrically connected to a source of power.

SR machines are realized in a variety of forms. In particular, they often differ in the numbers of stator and rotor poles on the stationary and rotating members, respectively, and in the number of independent circuits with which the controller is able separately to switch stator windings in and out of circuit. Each set of windings, made up of coils wound around one or more stator poles and separately switched in and out of circuit by the controller, constitutes one phase of the machine. The machine may have one or more such phases.

The theory, design and operation of SR machines is well documented, for example in the book 'Switched Reluctance Motors and their Control' by T. J. E. Miller, Clarendon Press, 1993 ("Miller") and the article 'The Characteristics, Design and Applications of Switched Reluctance Motors and Drives' by Stephenson et al., PCIM '93, Jun. 21–24, 1993 ("Stephenson").

FIG. 1 shows a known form of SR machine. The stator has six poles (A, A', B, B', C, C') and the rotor four poles. Each stator pole has one coil wound around it. Although only two coils on stator poles A and A' are shown in FIG. 1 for the sake of clarity, it will be appreciated that a similar arrangement would be formed in respect of the other pairs of poles. Typically, the coils on diametrically opposite poles are connected together either in series or in parallel (depending on the nature of the design of the machine) to form a phase of the machine. Thus, the machine in FIG. 1 is a three-phase machine in which the windings-of one phase are switchable independently from those of the other phases. When the machine is operated, each phase is normally connected to a source of electrical power through one or more electronic switches.

FIG. 2 of the drawings illustrates a typical switching circuit for a switched reluctance machine having three phases. The switches T1 and T2 are actuated together to connect the winding W across a supply voltage $V_s$. The phase winding and the switches are therefore exposed to the full supply voltage $V_s$. When the switches are configured with one switch open and the other switch closed, current in the inductive winding can 'freewheel' around the closed switch and its associated recirculating diode D1 or D2. When both switches are opened, any current in the winding is returned to the supply via diodes D1 and D2.

The switches are typically power semiconductor devices, e.g. insulated gate bi-polar transistors (IGBT's). IGBT's are commonly used because they are easy to control and relatively economical. However, as the supply voltage rises, the IGBT's reach a working limit above which they are likely to be unable to function correctly. One option is to replace the IGBT's with another form of switch better able to handle the high voltage, such as gate turn-off thyristors (GTO's). These devices are the usual components at supply voltages of 1,000 volts or more. However, they are relatively expensive compared with IGBTs and they are significantly more difficult to implement in the circuit and have limitations on switching speed.

It would be desirable to be able to extend the working voltage range of switching circuits in which switching devices, normally limited to a lesser maximum voltage, can be used. As will be apparent to the skilled person, the basic technical difficulties with operating an inductive load, such as a switched reluctance machine, from a relatively high voltage dc supply concern the limited voltage handling capabilities of a suitable power switching device. Connecting two suitable devices in series to share the voltage between them has been proposed but this requires further components for controlling the voltage sharing so that no one switch is overburdened for an excessive period. In the event of the voltage sharing control system failing (even for a brief period), the switches can be exposed to destructively large voltages.

Various circuits are known which attempt to divide the supply voltage by placing a string of two or more capacitors across the supply. For example, EP-A-074752 discloses a circuit for use with switched reluctance machines having an even number of phases. The phases of the machine are connected to the upper and lower halves of a center-tapped supply, thus reducing the voltage applied to the phase winding. However, when the phase is switched off, the action of the circuit is such as to apply the full supply voltage across the switch. There is therefore no advantage in this circuit as far as voltage rating of the switches is concerned.

SUMMARY OF THE INVENTION

It is an object of the present invention to provide a cost-effective switching circuit for an inductive load in which switching of the voltage across the load is shared between switching devices.

According to an embodiment of the present invention, there is provided a switching circuit for an inductive load having at least a first load portion and a second load portion, the switching circuit comprising:

a first switch arrangement having first and second junctions, the first load portion being connected with the first switch arrangement for controlling current therein;

a second switch arrangement having first and second junctions, the second load portion being connected with the second switch arrangement for controlling current therein; and first and second capacitor means respectively connected across the first and second junctions of each switch arrangement, the second junction of the first switch arrangement and the first junction of the second switch arrangement being connected at a node, common to the first and second capacitor means.

Thus, the voltage sharing is now effected by notionally splitting the load, up between two switching arrangements.

The capacitors create a self-balancing circuit. If one capacitor discharges due to a large current demand, the voltage across the second capacitor will be increased relative to that across the first capacitor. This will cause a greater current to flow through the second load portion, hence reducing the voltage on the second capacitor and thereby maintaining an overall balance at the node between the capacitors.

Preferably, each switch arrangement comprises a first switch having an input connected with the first junction and an output connected with one end of the first load portion, a second switch having an input connected with the other end of the first or second load portion, a first diode connected to conduct from the other end of the first load portion to the first junction, and a second diode connected to conduct from the second input terminal to the one end of the first load portion.

Preferably, each switch is a transistor, for example, an insulated gate bi-polar transistor.

Preferably, each capacitor means is a single capacitor.

Embodiments of the invention also extend to a switched reluctance drive system incorporating the switching circuit.

BRIEF DESCRIPTION OF THE DRAWINGS

The present invention can be put into practice in various ways some of which will now be described by way of example with reference to the accompanying drawings in which.

DETAILED DESCRIPTION OF PREFERRED EMBODIMENTS

Figure 3:
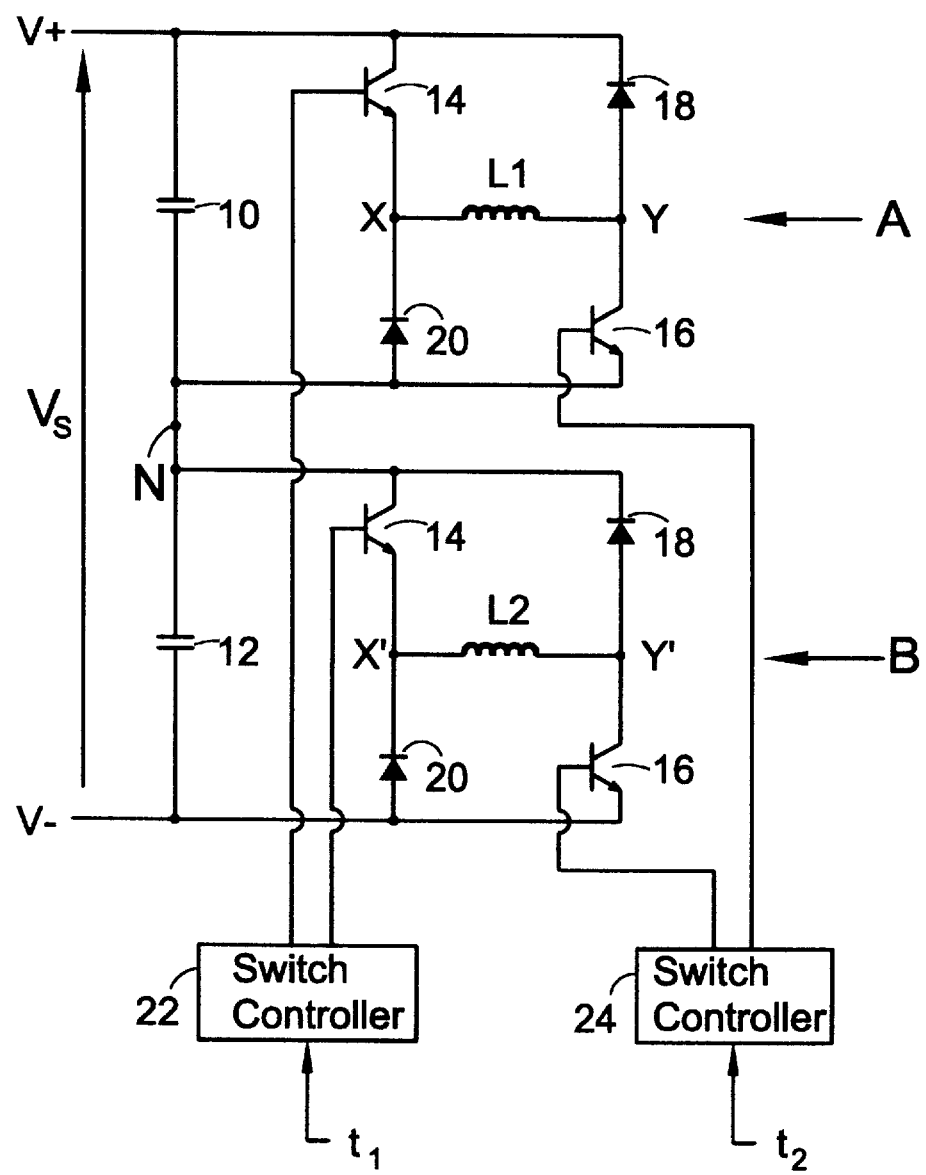
FIG. 3 is a circuit diagram of a switching circuit according to an embodiment of the invention.

Referring to FIG. 3, a power switching circuit for an inductive load comprises positive and negative dc supply terminals +V and −V. For the purposes of illustration, the load is simply illustrated as an inductor. It will be appreciated that this may take any of a number of forms in practice, for example the windings of a switched reluctance machine.

A pair of capacitors 10 and 12 are serially connected between the positive and negative supply junctions +V and −V. The mid-point between the two capacitors defines an electrical node N. It will be appreciated by the person of ordinary skill that a set of capacitors connected in series or parallel could be used in place of a single capacitor. This may be necessary to achieve the correct voltage rating for a particular application. The word 'capacitor' is intended to embrace such serial or parallel sets of capacitors, or a single capacitor unless the context otherwise dictates.

The inductive load to be controlled is split into two portions L1 and L2.

At the node N, the circuit is split into two separate switching arrangements A and B. In FIG. 3 like components in the two arrangements A and B are indicated by like reference numerals. Taking the upper switching arrangement (depicted by letter A in FIG. 3), all the components are connected between the positive junction +V and the relatively more negative node N. A first transistor 14 has its collector terminal connected with the positive junction V+ and its emitter terminal connected at point X with one end of the first portion L1 of the inductive load in which the current is to be controlled. In this embodiment the transistors are preferably insulated gate bipolar transistors.

A second transistor 16 has its collector terminal connected at point Y with the other end of the first portion L1 of the load and its emitter terminal connected with the node N. A first recirculating diode 18 is connected to conduct from point Y to the collector terminal of the transistor 14. A second recirculating diode 20 is connected to conduct from node N to point X.

Similarly, the lower arrangement of the switching circuit (depicted by letter B in FIG. 3) is connected around a second portion L2 of the load between points X' and Y'. The transistors and the diodes are connected in the same way between the relatively positive node N and the negative junction −V instead of the positive junction +V and the node N.

Figure 1:
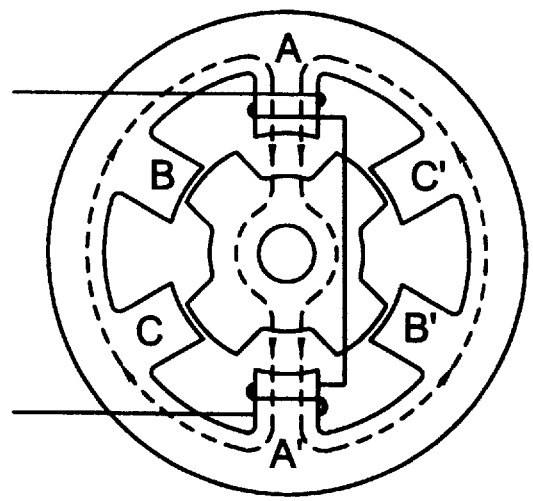
FIG. 1 is a cross-section of a typical reluctance machine.
Figure 2:
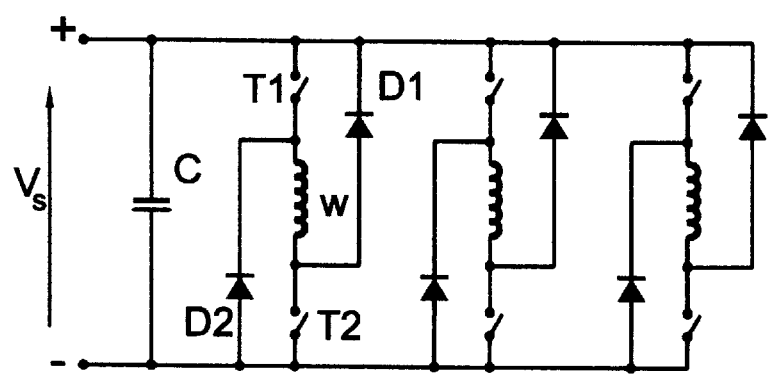
FIG. 2 is a circuit diagram of a conventional switching circuit for a switched reluctance machine.

The skilled person will be aware of the basic switching strategy of an inductive load using a switching circuit in accordance with FIG. 2. Essentially the same strategy of switching can be applied to the circuit of FIG. 3. When all four switches are closed, the two portions of the load are supplied from the corresponding capacitors 10 and 12. The current is also allowed to freewheel in both portions of the load by one of each of the pairs of transistors being on (e.g. 14) and the other of each pair of transistors being turned off (e.g. 16). The current is allowed to recirculate through its transistor (e.g. 14) and the associated recirculating diode (e.g. 18) to decay gradually. When all four switches are open, any remaining current in the load is returned to its source via the diodes.

Assuming both portions of the load are to be energized simultaneously, timing information $t_1$ and $t_2$ is provided to a pair of switch controllers 22 and 24 which are each connected to the bases of the first and second transistors, respectively. Depending on whether the overall control requires the transistors to be on, off or in a freewheeling arrangement, the controllers 22 and 24 will operate the pairs of first or second transistors together.

The present invention applies the full dc supply voltage $V_s$ across the load as with a conventional switching circuit except that switching is carried out for a voltage of approximately half the dc supply voltage across each switching circuit. Thus, each component in the separate switching circuit need have only half the voltage rating necessary for a conventional circuit controlling current in the winding as a whole.

Those of ordinary skill in the art will appreciate that, by using the same principle, the circuit could be divided into three or more sections, thus further reducing the voltage to which the switches are exposed.

Figure 4:
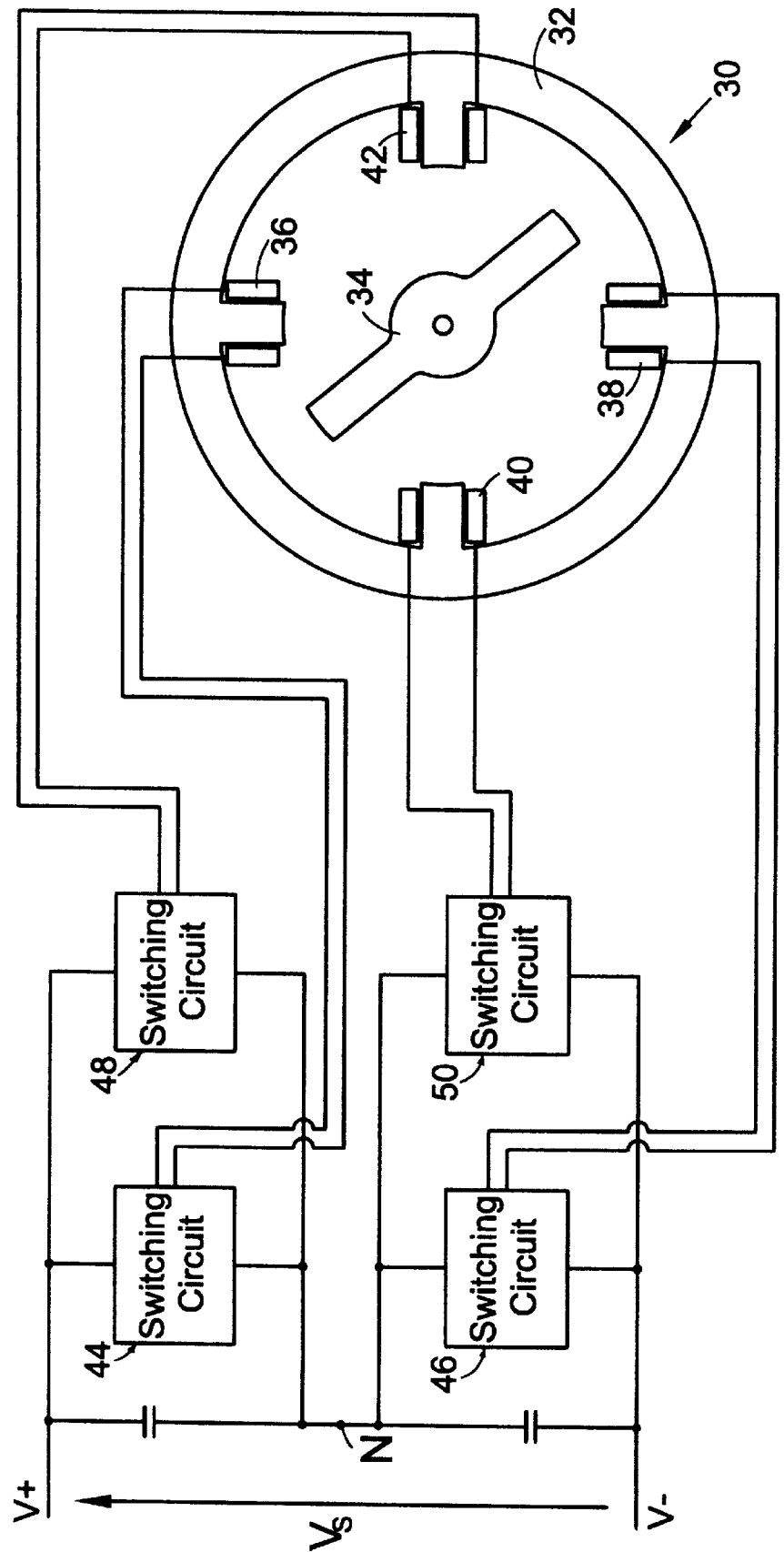
FIG. 4 is a schematic diagram of a switched reluctance drive system, according to an embodiment of the invention.

FIG. 4 snows a switched reluctance drive system using power switching circuits according to an embodiment of the present invention. A reluctance machine 30 comprises a four pole stator 32 and a two pole rotor 34. This arrangement has been used for the sake of clarity. It will be appreciated that any combination of stator and rotor pole numbers can be used as appropriate to the machine art in question. The stator poles have phase winding portions 36–42 which are energized by actuation of two pairs of power switching circuits 44, 46, 48 and 50 of the type depicted in FIG. 3. The portions 36 and 38 are the windings making up one phase of the machine, while the portions 40 and 42 make up the other phase winding.

According to the invention, the winding portions associated with one phase, wound on a pair of opposed stator poles, are each connected between the points X and Y and X' and Y', respectively, as shown in FIG. 3. Thus, while the portions of the windings associated with a particular phase are ganged to be energized together, they are not actually connected together in serial or parallel. Particularly advantageously in high-voltage applications, the burden placed upon the components in a power circuit associated with a phase winding is shared between the separate circuits so that lower rated and/or more cost effective components can be used. Overall the phase winding in question has the full supply voltage $V_s$ applied across it, but the connection at the node N creates a potential difference across each circuit that is broadly half the full supply voltage.

Figure 5:
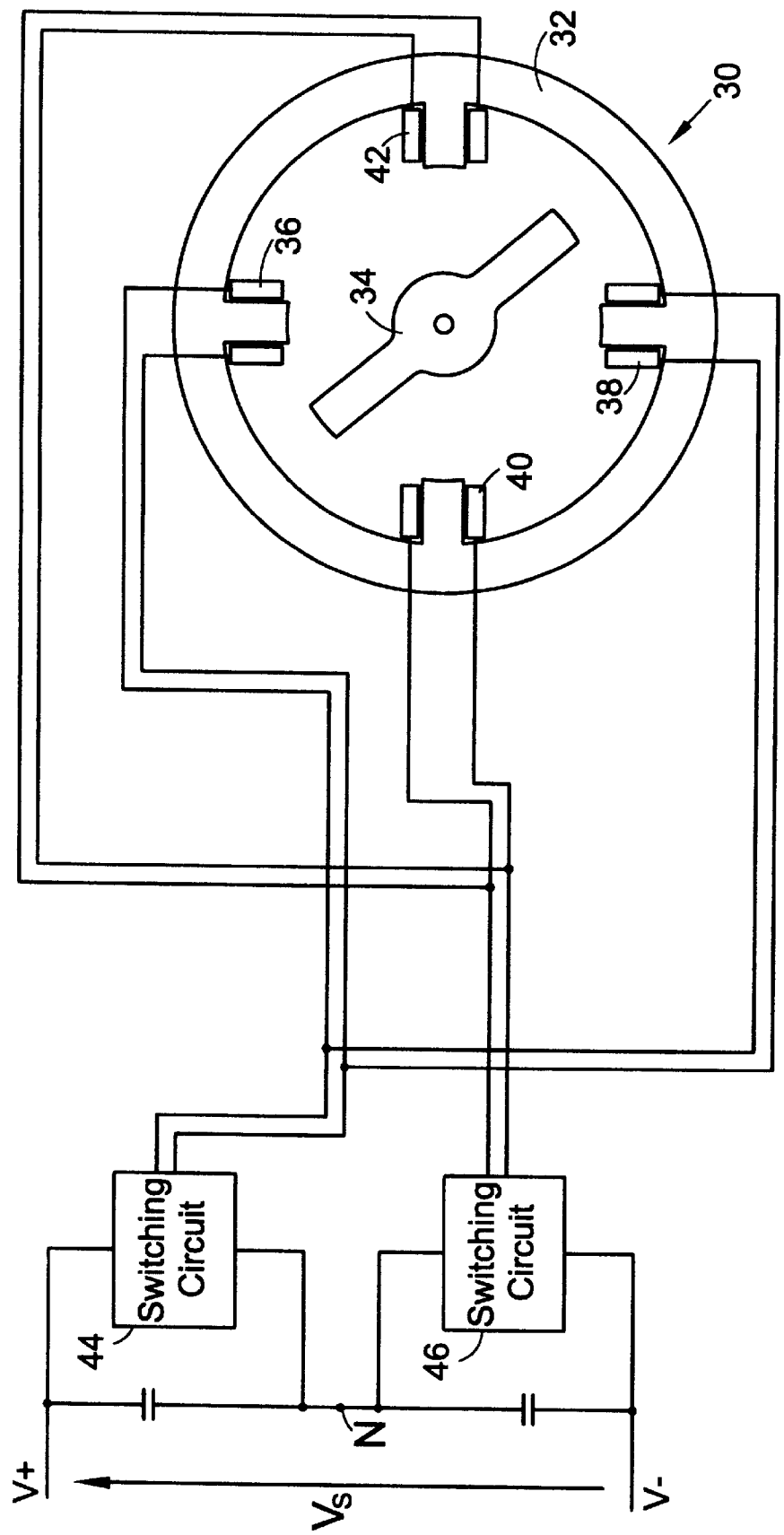
FIG. 5 is an alternative form of a switched reluctance drive system according to an embodiment of the invention.

This invention can be applied to switched reluctance drives in other ways. FIG. 5 shows a further embodiment where a complete phase of the switched reluctance machine is associated with an upper or lower switching circuit. Like reference numerals for like parts are used in FIG. 5 as they are shown in FIG. 4. In this embodiment, the phase winding portions 36/38 and 40/42 can be connected in series or in parallel to constitute a phase winding. A two-phase machine is again used for illustration, though the skilled person will realize that other numbers of phases can be used, provided that the number is even.

Whereas the arrangements of FIGS. 3 and 4 distribute the portions of a winding between upper and lower switching circuits and switch them simultaneously, when the machine of FIG. 5 is operated, the phase windings are energized in known sequence, and power is drawn alternately through the upper and lower switching circuits. With this embodiment, the number of connections between the motor and the power converter is reduced compared with the embodiment shown in FIG. 4.

Although the invention has been described in terms of rotary machines, the skilled person will be aware that the same principle of operation can be applied to a linear reluctance motor to equal effect. The moving member of a linear motor is referred to in the art as a rotor. The term 'rotor' used herein is intended to embrace the moving member of a linear motor as well.

The principles of the invention which have been disclosed by way of the above examples can be implemented using various circuit types and arrangements. It will be appreciated by the skilled person that, while the invention has been disclosed in terms of the two parts of the inventive switching circuit being connected across windings associated with separate stator poles, embodiments of the invention could equally well be used in relation to two parts of the same winding on a single pole. Again, the switching circuit of the invention is arranged to switch a total voltage by means of switching stages. Also, the switching voltage range of various other switching circuits could be extended when switching an inductive load according to embodiments of the invention. In the particular field of switched reluctance machines other circuits as described in both Miller and Stephenson referred to above, for example, could be implemented according to the invention to realize equivalent advantages. Furthermore, it will be appreciated that a reluctance machine can be run equally well as a motor or a generator. The invention applies to the same extent to both switched reluctance motors and switched reluctance generators or any other inductive load in relation to which energy is being delivered to or taken from that load.

Those skilled in the art will readily recognize that these and other modifications and changes may be made to the present invention without strictly following the exemplary applications illustrated and described herein and without departing from the true spirit and scope of the present invention which is set forth in the following claims.

What is claimed is:

1. A switched reluctance drive system comprising a reluctance machine having a rotor, a stator and at least one phase winding having at least first and second winding portions, and a switching circuit for controlling the current in the winding, the switching circuit comprising:

a first switch arrangement having first and second junctions, the first switch arrangement being connected with the first winding portion for controlling current in the first winding portion;

a second switch arrangement having first and second junctions, the second switch arrangement being connected with the second winding portion for controlling current in the second winding portion; and first and second capacitors respectively connected across the first and second junctions of each switch arrangement, the second junction of the first switch arrangement and the first junction of the second switch arrangement being connected at a node between the first and second capacitors, the switch arrangements being operable to share a full voltage applied between the first junction of the first switch arrangement and the second junction of the second switch arrangement such that each winding portion is free of exposure to said full voltage;

wherein the at least one phase winding is subject to unipolar excitation.

2. The system of claim 1, wherein:

the first switch arrangement further comprises:
a first switch having a first terminal connected with the first junction of the first switch arrangement, and a second terminal connected with one end of the first winding portion; and
a second switch having a first terminal connected with the other end of the first winding portion and a second terminal connected with the node; and the second switch arrangement further comprises:
a first switch having a first terminal connected with the node and a second terminal connected with one end of the second winding portion; and
a second switch having a first terminal connected with the other end of the second winding portion and a second terminal connected with the second junction of the second switch arrangement.

3. The system of claim 2, wherein:

the first switch arrangement further comprises:
a first diode connected to conduct from the other end of the first winding portion to the first junction of the first switch arrangement; and
a second diode connected to conduct from the node to the one end of the first winding portion; and the second switch arrangement further comprises:
a first diode connected to conduct from the other end of the second winding portion to the node; and
a second diode connected to conduct from the second junction of the second switch arrangement to the one end of the second winding portion.

4. The system of claim 3, wherein each switch is a transistor.

5. The system of claim 4, wherein each transistor is an insulated gate bi-polar transistor.

6. The system of claim 1, wherein each switch arrangement includes a transistor.

7. The system of claim 6, wherein each transistor is an insulated gate bi-polar transistor.

8. The system of claim 1, wherein the first and second capacitors each are single capacitors.

9. A switched reluctance drive system comprising a reluctance machine having a rotor, a stator and at least two phase windings, each phase winding including at least one winding portion, and a switching circuit for controlling current in each of the windings, the switching circuit comprising:
- a first switch arrangement having first and second junctions, the first switch arrangement being connected with the at least one winding portion of one of the phase windings for controlling current in the one phase winding;
- a second switch arrangement having first and second junctions, the second switch arrangement being connected with the at least one winding portion of the other of the phase windings for controlling current in the other phase winding; and
- first and second capacitors respectively connected across the first and second junctions of each switch arrangement, the second junction of the first switch arrangement and the first junction of the second switch arrangement being connected at a node between the first and second capacitors, the switch arrangements being operable to share a full voltage applied between the first junction of the first switch arrangement and the second junction of the second switch arrangement such that each winding portion is free of exposure to said full voltage;
- wherein the at least two phase windings are subject to unipolar excitation.

10. The system of claim 9, wherein:
the first switch arrangement further comprises:
- a first switch having a first terminal connected with the first junction of the first switch arrangement, and a second terminal connected with one end of the one phase winding; and
- a second switch having a first terminal connected with the other end of the one phase winding and a second terminal connected with the node; and the second switch arrangement further comprises:
- a first switch having a first terminal connected with the node, and a second terminal connected with one end of the other phase winding; and
- a second switch having a first terminal connected with the other end of the other phase winding and a second terminal connected with the second junction of the second switch arrangement.

11. The system of claim 10, wherein:
the first switch arrangement further comprises:
- a first diode connected to conduct from the other end of the one phase winding to the first junction of the first switch arrangement; and
- a second diode connected to conduct from the node to the one end of the one phase winding; and the second switch arrangement further comprises:
- a first diode connected to conduct from the other end of the other phase winding to the node; and
- a second diode connected to conduct from the second junction of the second switch arrangement to the one end of the other phase winding.

12. The system of claim 9, wherein each phase winding comprises at least two winding portions which are connected in series.

13. The system of claim 9, wherein each phase winding comprises at least two winding portions which are connected in parallel.

* * * * *